United States Patent [19]

Smolen

[11] 4,015,034

[45] Mar. 29, 1977

[54] REGISTER FOR INDEX MARKING ARTICLE

[76] Inventor: Benjamin Edward Smolen, 1501 Broadway, New York, N.Y. 10036

[22] Filed: Aug. 23, 1976

[21] Appl. No.: 716,788

Related U.S. Application Data

[63] Continuation-in-part of Ser. No. 693,496, June 7, 1976, abandoned.

[52] U.S. Cl. ................................ 428/40; 33/180 R; 33/184.5; 96/43; 101/DIG. 12; 156/234; 156/240; 427/146; 427/152; 428/198; 428/914

[51] Int. Cl.$^2$ ........................ B32B 3/16; B44C 1/16

[58] Field of Search ............. 96/43, 43 CL; 33/180, 33/184.5; 428/40, 198, 914; 156/254, 234, 235, 239, 240; 101/DIG. 12; 427/146, 147, 152

[56] References Cited

UNITED STATES PATENTS

| | | | |
|---|---|---|---|
| 2,016,599 | 10/1935 | Graves | 428/914 |
| 2,760,273 | 8/1956 | Bregman | 101/DIG. 12 |
| 3,212,913 | 10/1965 | MacKenzie | 428/914 |
| 3,333,357 | 8/1967 | Grogan | 96/43 CL |

OTHER PUBLICATIONS

Zimmerman et al., 1960 Supplement to the 1953 Handbook of Material Tradenames, p. 201, E. I. du Pont Co., Trademark No. 611987, 9/1955.

*Primary Examiner*—George F. Lesmes
*Assistant Examiner*—R. J. Roche
*Attorney, Agent, or Firm*—Mark T. Basseches; Paula T. Basseches

[57] ABSTRACT

The present invention relates to an article for applying register or index markers or other indicia to superimposed sheets or layers in precise registration, the device leaving a particular configuration on one such sheet or layer and a silhouette thereof on the other such layer.

8 Claims, 5 Drawing Figures

REGISTER FOR INDEX MARKING ARTICLE

This application is a continuation-in-part of my application Ser. No. 693,496, filed June 7, 1976, now abandoned.

BACKGROUND

1. Field of the Invention

The present invention is in the field of index marking and particularly dry transfer index marking means.

2. The Prior Art

In certain fields, e.g. architecture, illustration, design, engraving, etc., artistic representations are frequently made on two or more superimposed sheets whereby the representations or components appearing on the superimposed sheets bear a specific positional relation to each other. Subsequently, the sheets bearing the various components of the design are separated, for instance in order to make separate photographs of the sheets as an element of a three color engraving process. Thereafter, to secure a finished picture or design, it is necessary that the photographs, etchings or projections thereof be aligned in precise superimposed relation.

To facilitate such repositioning, it is conventional to mark each of the layers with index marks, such as an X, a circle, etc., while the same are still superimposed. Initially, the application of such index marks was a time-consuming procedure, involving manually accurately adjusting the position of a subsequent index mark so that it was precisely disposed over an earlier placed mark. The procedure was repeated for each superimposed sheet. Since it is customary to place a multiplicity of registering index marks at various locations on the superimposed sheets, a substantial amount of time and effort were consumed in the marking operation.

In accordance with my U.S. Pat. No. 3909,329, there is disclosed an article for substantially accelerating the marking procedure. Briefly, in accordance with such patent, there is provided an article having on its opposed faces, index markings printed in precise register with each other. The device is used by disposing the same between two sheets and rubbing a stylus across the uppermost of the sheets while the lower sheet is supported on a hard surface, whereby index marks are released upwardly and downwardly in precise registry.

While the device in accordance with the noted patent has greatly expedited and facilitated the application of register markings, the manufacture of such device, necessitating as it does an imprinting on opposite surfaces of a single sheet in precise registry, has proved costly to manufacture and has required careful adjustment of the printing facilities.

SUMMARY

The present invention may be summarized as directed to an improved article for applying index marks or like markings in register on superimposed sheets, the device being substantially more simple to manufacture than the article in accordance with my above referenced patent in that exact image registration need not be achieved in the printing procedure.

After activation, the device leaves a positive representation on one sheet and a silhouette on the other. Subsequent alignment of the marked sheets is facilitated in that, when proper orientation is achieved, a wholly opaque area is disclosed, any misalignment being indicated by an area of non-opaqueness.

More specifically, the article of the present invention is comprised of a carrier sheet having a high release surface overprinted with a releasible, discontinuous film in the form, for instance, of a cross, circle, combination thereof, etc. The film encompasses, e.g. surrounds or partially surrounds, uncoated areas of the release surface.

In the area above the film, a continuous second marking is imprinted, the second marking being comprised of an opaque, readily frangible layer, such as an ink layer, which is highly adherent to the upper surface of the film and to the release surfaces encompassed by the film.

An adhesive layer overlies the second marking layer, the adhesive preferably being of the type which is activated, although conventional pressure sensitive material may sometimes be advantageous.

The device, prior to application, will give the appearance merely of a spot corresponding to the opaque second marking.

The carrier preferably is provided with a pressure sensitive backing on the non-release coated face to enable its attachment to one of the two superimposed sheets. When the surface of the sheet is rubbed with a stylus, etc. to activate the adhesive overlying the opaque marking and the sheets are separated, the film defining the index marking as well as those portions of the second marking layer in registry therewith will be carried over by the adhesive onto the sheet in contact with the adhesive layer. There will be left on the carrier sheet those components of the second marking layer which were in direct contact with the release coat due to the greater affinity of the ink for the release coat than the pulling power of the adhesive.

It will thus be observed that a silhouette of the indicia remains on the carrier sheet and the indicia, and portions of the marking layer connected thereto, are transferred to the upper sheet.

It will be understood that the apparatus, while principally intended for use as a register marking for positioning sheets, is susceptible of many other uses, e.g. as a novelty device wherein secret writing (the indicia configuration) appears after the device is activated, the marking being concealed or occluded until activation.

A principal advantage of the instant device lies in the fact that the overprinting or second marking layer need not be accurately imprinted relative to the first since, after activation, the remaining markings will always precisely comprise an index marking and a silhouette.

It is accordingly an object of the invention to provide an improved article for applying register devices to superimposed sheets.

A further object of the invention is the provision of an article of the type described which may be manufactured without the use of precise printing procedures.

To attain these objects and such further objects as may appear herein or be hereinafter pointed out, reference is made to the accompanying drawings, forming a part hereof, in which.

Figure 4:
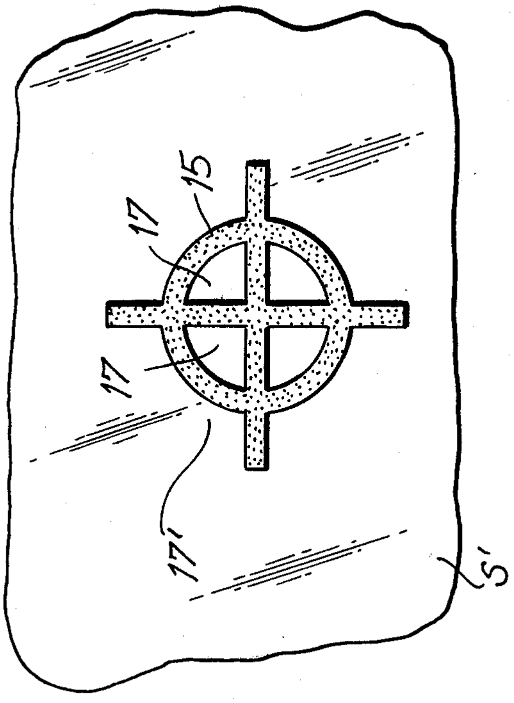
FIG. 4 is a plan view taken in the direction of the arrows 4—4 of FIG. 3.

In accordance with one embodiment of the invention, there is shown a marking article 10 which comprises a carrier sheet 11 of paper or the like. The carrier sheet 11 may include a pressure sensitive or like adhesive layer 12 to enable its mounting to the lowermost sheet S of two sheets S, S′ to which superimposed register marks are subsequently to be applied. As is conventional, a peelable backing strip 13 may be disposed over the adhesive layer 12 to protect the same until use.

A release layer 14, such as Quilon, vinyl or the like, defines a high release surface of the carrier 11. Quilon is a trade name of Werner-type chromium complex compounds useful as anti-blocking or release agents. The release layer or surface 14 is overprinted with an index or indicium mark 15, the mark 15 being comprised of a coherent film forming material, known per se particularly in connection with so-called dry transfer sheets and devices. Suitable formulations for film forming layer 15 and procedures for application thereof are described and illustrated in U.S. Pat. Nos. 2558,803; 3013,917; 3131,106; 3212,913; 3275,465; 3294,612, by way of example. A lacquer material may alternatively be employed. Generally, the material for formation of the indicium should comprise a high polymer and a plasticizer, and, optionally, a colored pigment.

The layer defining the index mark 15 is lightly adherent to the surface 14. Above the index layer 15 there is deposited an opaque second layer 16 comprised of a continuous, opaque, readily frangible marking, the second layer being disposed in registry with the index layer 15.

The opaque layer 16 is compounded so as to be of relatively low coherence but strongly adherent to the release layer 14 and to the film forming indicia components 15.

It will be readily recognized that the formulation of the opaque layer 16 should be tailored in accordance with the characteristics of the particular release layer and indexing marking layer employed in each instance. By way of example, and without limitation, where a Quillon release layer is employed, a non-tensile oil or water based silk screen ink may be employed.

Figure 2:
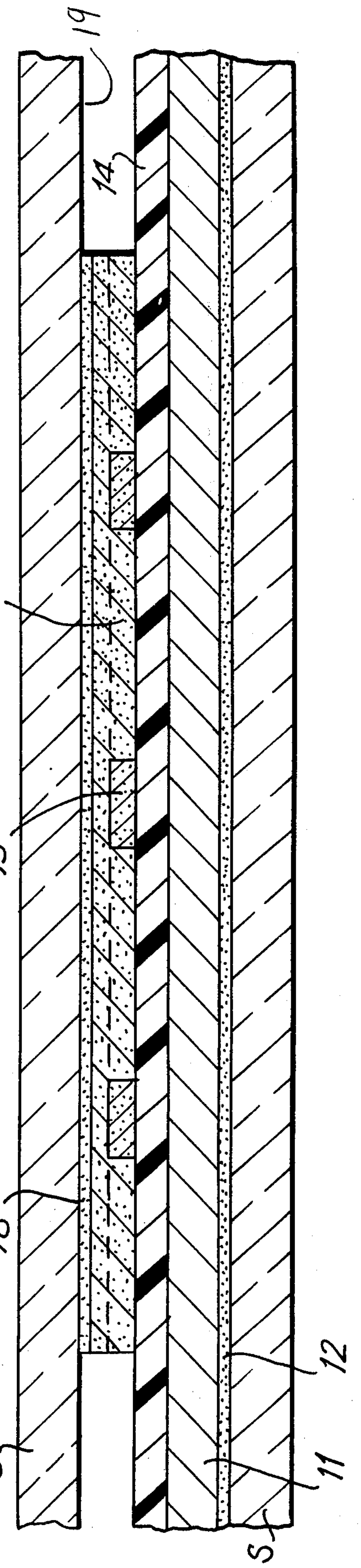
FIG. 2 is a magnified section taken on the line 2—2 of FIG. 1.

As appearing in FIG. 2, for instance, ink 16 will cover not only the upper surfaces of the indicia 15 but will also flow through the discontinuities of the indicia into contact with the portions of the release layer 14 encompassed by the indicia 15.

The term "encompassed by" as employed herein is intended to refer to those areas, such as 17, 17′, of the layer 14 which are completely or partially surrounded by elements of the indicia 15.

After setting of the marking layer 16, there is applied over the marking layer a thin layer 18 of adhesive. Preferably the adhesive layer 18 is of the low tack, pressure activated type and may comprise microcrystalline wax. Suitable adhesive formulations are disclosed in one or more of the above cited patents and have the property of being non-tacky, enabling their movement across a surface to which adhesive contact is to be effected until a desired position is achieved, whereupon the adhesive is activated to a relatively tenacious bond by burnishing. Also, the adhesive preferably has a low shear strength after activation.

With the elements assembled in the manner shown in FIG. 2, the adhesive layer 18 is activated by burnishing or scanning the area of one or the other of the sheets S, S′ through the use of a ball point pen, coin, etc., the other sheet preferably resting on a hard surface. The burnishing action will function to render the adhesive layer 18 strongly connected to the under surface 19 of the upper transparency or sheet S′.

After activation of the adhesive layer 18, the upper transparency S′ and the lower transparency S are separated by stripping. Upon such separation, the indicia 15, which are initially or after burnishing lightly adherent to the release coat 14, will be carried upwardly with the upper sheet S′ by the adhesive. The surface 20 of the indicia 15, which had theretofore been in contact with the release layer, will now be exposed.

Figure 3:
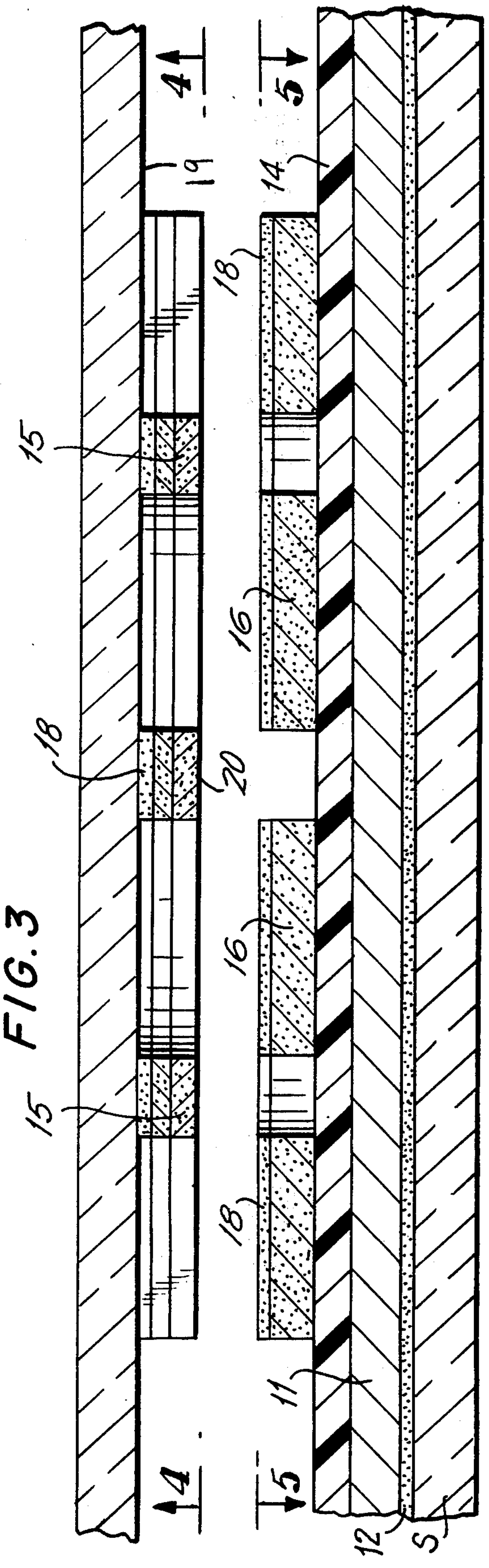
FIG. 3 is a section similar to FIG. 2 after activation of the article and separation of the sheets.

It will be recalled that the indicia will travel with the layer S′ due to the adherence of the adhesive layer 18 to the layer 16 and the strong bond of the layer 16 to the engaged surface of the indicia 15. Due to the frangible nature and/or relative lack of cohesiveness of the material 16, due in part to the thinness thereof and perhaps augmented by the burnishing action used to activate the adhesive, the layer 16 fractures neatly in registry with the lateral extremities of the more coherent indicia 15 which are lifted bodily through the layer 16. The condition of the various elements following stripping is clearly shown in FIG. 3.

Figure 5:
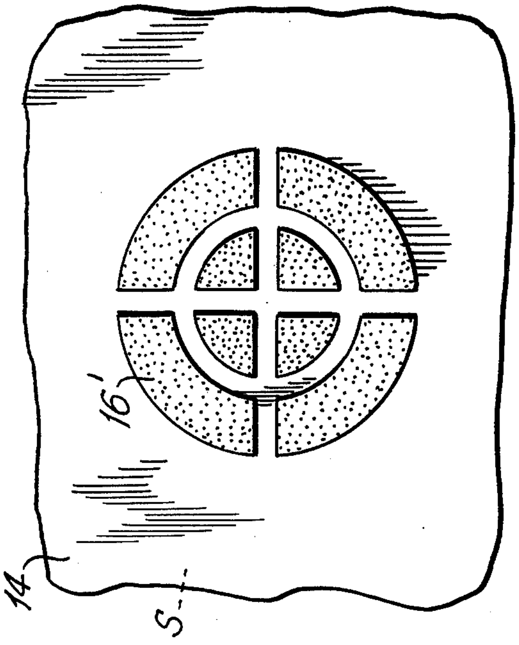
FIG. 5 is a plan view taken in the direction of the arrows 5—5 of FIG. 3.
Figure 1:
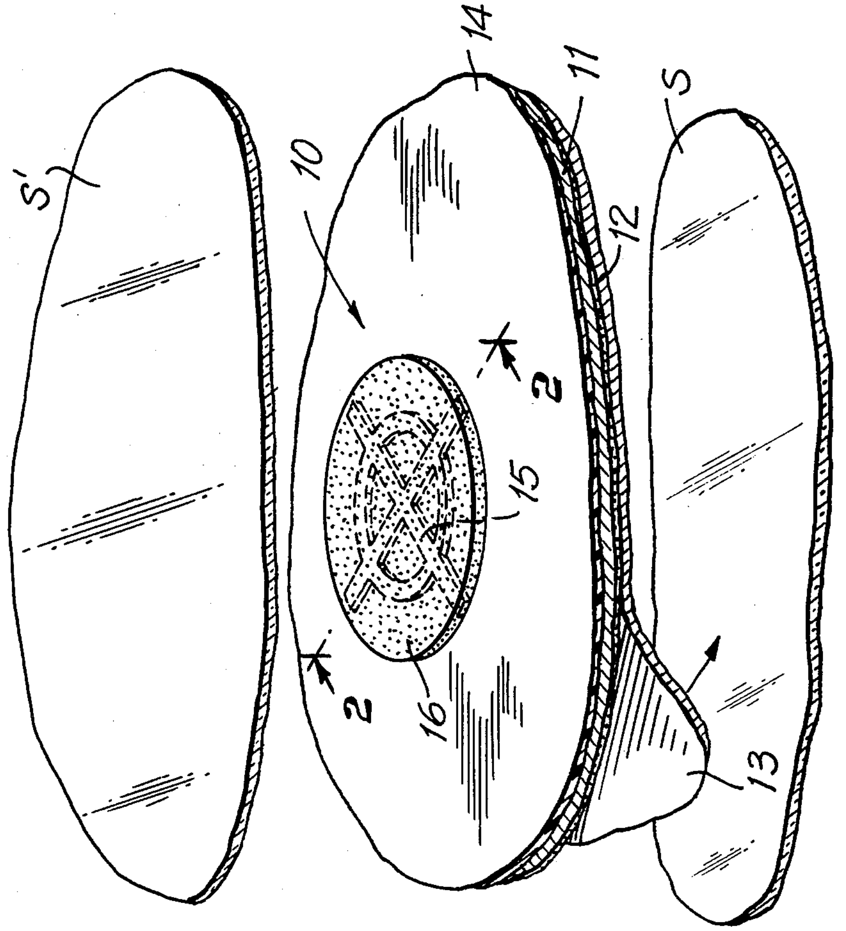
FIG. 1 is a fragmentary perspective view of an article in accordance with the invention disposed between two sheets.

As noted in FIGS. 4 and 5, the indicia 15 are securely affixed to the upper sheet S′ while a silhouette 16′, constituting those portions of the layer 16 which contacted the sheet S, will remain on the sheet S. When it is desired subsequently to place the sheets S and S′ in registry, it will be observed that, by virtue of the perfect positive-silhouette relationship, proper alignment is signalled by the complete opacity of the area occupied by the silhouette and indicia.

It is important to note that precise registration of the sheets is not dependent upon the imprinting of the layer 16 over the indicia 15 with an especially high degree of accuracy. Obviously, the opaque or partially opaque layer 16 may be disposed to one or the other side of precise registry with the indicia so long as there is at least partial overlap and nonetheless, upon activation and separation, the transferred indicia and silhouette will be in exact registry.

The specific ink employed in the formation of the layer 16 is not especially critical, provided that good adherence of such ink to the release layer and to the film of the indicia is obtained. For instance, even if, upon separation, some portions of the layer 16 laterally offset from the indicia are carried along with the indicia, the silhouette remaining on the sheet S will reflect such imperfect transfer, and upon subsequent superimposition, a complete obliteration, free of bright spots, will signify accurate relative location of the sheets.

The same effect is observed if, through some mischance, a portion of the indicia film may rip and remain on the release layer upon separation of the sheets S, S′.

While the instant invention and the illustrated embodiment have been described especially in the context of a principal use as a means for effecting registration of two or more superimposed sheets, it will be readily recognized that the article has utility as a novelty item. For instance, the indicia layer 15 may be in the form of a secret word or symbol which may thereafter be covered by an opaque layer 16, rendering the layer 15 invisible. It is only after burnishing of the area to activate the adhesive and separation of the respective layers 15 and 16 that the secret word, symbol, etc. will become apparent. The indicium may carry a pigment of a color contrasting to that of the opaque layer.

With the foregoing in mind, it will be readily recognized by those skilled in the art that numerous variations may be made in the specific materials employed without departing from the principal contribution of the invention, a central aspect of which involves covering a coherent index, design or message forming film disposed on a release surface with a continuous, readily frangible opaque film, which latter film is strongly adherent to the release layer and, through the use of a covering adhesive layer, whether pressure sensitive or otherwise, causing the indicium film and those areas of the opaque film in registry therewith to be transferred, leaving a silhouette image of the opaque film on the release layer.

It is within the contemplation of the invention to employ as the index forming film component a pigmented material which is itself opaque and which may be of contrasting color to that of the opaque layer.

Similarly, the index forming layer may be transparent or translucent, whereby, on separation, coloration of the sheet carrying the index layer will be that of those components of the opaque layer which are adherent to the sheet which carries the index after stripping.

The term "opaque" as used herein should not be interpreted in the limitative sense of an absolutely concealing or non-light transmitting layer. Where it is not important that the indicia be concealed in the first instance, it is feasible that the layer 16 permit partial transmission of light so long as the light blocking propensities of this material are sufficiently great to enable an operator seeking to realign the silhouette and indicia after separation to recognize that such realignment has been achieved.

Still other and further variations, such as incorporation of adhesive in the opaque layer, may be satisfactorily employed. Accordingly, the invention is to be broadly construed within the scope of the appended claims.

Having thus described the invention and illustrated its use, what is claimed as new and is desired to be secured by Letters Patent is:

1. An article for applying an index mark and a silhouette thereof in precise registry respectively on a superimposed pair of receiver sheets between which said article is disposed comprising, in combination, a carrier sheet having a release surface, an indicia marking comprised of a coherent, opaque, discontinuous film releasibly bonded to said release surface, said film at least partially encompassing uncoated areas of said release surface, a second, continuous, opaque, readily frangible marking disposed in registry with said indicia marking and said encompassed areas, said second marking being firmly adherent to said encompassed areas of said release surface and to the films of said indicia marking, and an adhesive layer covering said second marking whereby, when said adhesive layer is secured to a receiver sheet and said carrier sheet peeled away from said receiver sheet, said adhesive, said first indicia marking, and the portions of said second marking in registry with said first marking will be transferred to said receiver sheet and the portions of said second marking in registry with said encompassed areas will remain on said carrier.

2. Article in accordance with claim 1 wherein said carrier includes an adhesive surface on the face opposite said release surface for securing said carrier to a said sheet.

3. Article in accordance with claim 1 wherein said adhesive layer is of the type having an initial low tack which is rendered highly adherent responsive to localized high pressure such as exerted by a stylus scanned in registry therewith.

4. Article in accordance with claim 3 wherein said frangible second marking is fractured in registry with the outlines of said film responsive to the pressures effective to activate said adhesive.

5. Article in accordance with claim 1 wherein said release surface comprises a Werner-type chromium complex compound.

6. An article for applying an index mark and a silhouette thereof in precise registry respectively on a superimposed pair of receiver sheets between which said article is disposed comprising, in combination, a carrier sheet having a release surface, an indicium comprised of a coherent film releasibly bonded to said release surface, said film at least partially encompassing areas of said release surface, a second continuous, opaque, readily frangible layer disposed in registry with said indicium and with said encompassed areas, said second layer being firmly adherent to said encompassed areas of said release surface and to said indicium, and an adhesive layer covering said second layer, whereby, when said adhesive layer is secured to a receiver sheet and said carrier sheet pulled away from said receiver sheet, said adhesive, said indicium and the portions of said second layer in registry with said indicium will be transferred to said receiver sheet, and the portions of said second layer in registry with said encompassed areas will remain on said carrier.

7. An article in accordance with claim 6 wherein said indicium includes coloring material.

8. An article in accordance with claim 7 wherein said coloring material is of a contrasting color to the coloring material of said opaque layer.

* * * * *